US008867983B2

(12) United States Patent
Zhu et al.

(10) Patent No.: US 8,867,983 B2
(45) Date of Patent: Oct. 21, 2014

(54) METHOD AND APPARATUS FOR CONTROLLING A RELAY STATION IN A MULTI-HOP RELAY NETWORK

(75) Inventors: Chenxi Zhu, Gaithersburg, MD (US); Michiharu Nakamura, Kanagawa (JP); Dorin Viorel, Calgary (CA)

(73) Assignee: Fujitsu Semiconductor Limited, Yokohama (JP)

( * ) Notice: Subject to any disclaimer, the term of this patent is extended or adjusted under 35 U.S.C. 154(b) by 1018 days.

(21) Appl. No.: 12/191,762

(22) Filed: Aug. 14, 2008

(65) Prior Publication Data

US 2009/0075588 A1  Mar. 19, 2009

Related U.S. Application Data

(60) Provisional application No. 60/973,680, filed on Sep. 19, 2007.

(51) Int. Cl.
| | |
|---|---|
| H04B 3/36 | (2006.01) |
| H04L 27/26 | (2006.01) |
| H04B 7/26 | (2006.01) |
| H04W 72/12 | (2009.01) |
| H04B 7/155 | (2006.01) |
| H04W 84/04 | (2009.01) |

(52) U.S. Cl.
CPC .......... *H04B 7/2606* (2013.01); *H04W 84/047* (2013.01); *H04L 27/2602* (2013.01); *H04L 27/2655* (2013.01); *H04W 72/1257* (2013.01); *H04B 7/155* (2013.01)
USPC ............ 455/7; 455/11.1; 455/13.1; 455/13.2; 455/18; 455/455; 370/315; 370/316

(58) Field of Classification Search
USPC .......... 455/7, 11.1, 13.1, 13.2, 18, 24, 78, 83, 455/550.1, 455; 370/315–316
See application file for complete search history.

(56) References Cited

U.S. PATENT DOCUMENTS

| | | | |
|---|---|---|---|
| 7,233,771 B2 * | 6/2007 | Proctor et al. | 455/11.1 |
| 2007/0066220 A1 * | 3/2007 | Proctor et al. | 455/11.1 |
| 2007/0268846 A1 * | 11/2007 | Proctor et al. | 370/279 |
| 2007/0281720 A1 * | 12/2007 | Lee | 455/466 |

(Continued)

FOREIGN PATENT DOCUMENTS

| | | |
|---|---|---|
| EP | 1 915 005 A2 | 4/2008 |
| JP | 2006-74325 | 3/2006 |

(Continued)

OTHER PUBLICATIONS

Japanese Office Action mailed Sep. 3, 2013 in corresponding Japanese Application No. 2008-240079.

(Continued)

*Primary Examiner* — Fayyaz Alam
(74) *Attorney, Agent, or Firm* — Staas & Halsey LLP (57) ABSTRACT

A method of controlling a relay station in a cell of a multi-hop relay network in accordance with a one-way propagation delay between a base station in the cell and the relay station. A relay station in a cell of a multi-hop relay network including means for controlling the signal flow between the relay station and the various other stations in the cell in accordance with a one-way propagation delay between a base station in the cell and the relay station.

12 Claims, 5 Drawing Sheets

(56) References Cited

U.S. PATENT DOCUMENTS

| | | |
|---|---|---|
| 2008/0045148 A1* | 2/2008 | Okuda .......................... 455/18 |
| 2008/0095038 A1* | 4/2008 | Chang et al. ................. 370/208 |
| 2008/0240719 A1 | 10/2008 | Kim et al. |
| 2011/0051629 A1* | 3/2011 | Chun et al. ................... 370/279 |
| 2011/0070821 A1* | 3/2011 | Chun et al. ....................... 455/7 |

FOREIGN PATENT DOCUMENTS

| | | |
|---|---|---|
| JP | 2009-528804 | 8/2009 |
| WO | WO 2007/004923 A1 | 1/2007 |
| WO | WO 2007/100232 A1 | 9/2007 |

OTHER PUBLICATIONS

Gang Shen et al., "Recommendations on IEEE 802.16j", IEEE C802.16j-06/004rl, May 8, 2006, pp. 1-7.

Dorin Viorel et al., "On the Issue of Frame Alignment and Gaps", IEEE C802.16j-07/539, Sep. 18, 2007, pp. 1-3.

Comstock, David, "RSRTG/RSTTG Modifications", IEEE C802.16j-08/081, Mar. 20, 2008.

Shen, Gang, et al., "Clarification on R-RTG for Transparent Relay", IEEE C802.16j-08/033, Jan. 14, 2008.

Viorel, Dorin, et al., "On the issue of frame alignment and gaps", IEEE C802.16j-07/539r3, Nov. 14, 2007.

Viorel, Dorin, et al., "On the issue of frame alignment and gaps", IEEE C802.16j-07/539r1, Nov. 1, 2007.

Comstock, David, "RSRTG allowance modification", IEEE S802.16j-07/508, Sep. 9, 2007.

Huo, Charlie, et al., "On the issue of frame alignment and gaps", IEEE C802.16j-07/266r4, Mar. 14, 2007.

Office Action issued by the Japanese Patent Office on Dec. 11, 2012 in the related Japanese patent application No. 2008-240079.

Office Action mailed by the Japanese Patent Office on Aug. 28, 2012 in the related Japanese patent application No. 2008-240079.

* cited by examiner

METHOD AND APPARATUS FOR CONTROLLING A RELAY STATION IN A MULTI-HOP RELAY NETWORK

CROSS-REFERENCE TO RELATED APPLICATIONS

The present application claims priority to provisional application titled "Partitioned Multihop Frame Structure", Ser. No. 60/973,680, filed Sep. 19, 2007, inventors Chenxi Zhu, Michiharu Nakamura, and Dorin Viorel, which is incorporated herein by reference.

BACKGROUND OF THE INVENTION

Description of the Related Art

Wireless communication networks have become increasingly popular and generally include a base station that provides service to a cell area located around the base station. Mobile stations (such as cell phones, etc.) are able to communicate with the base station when they are within the service area of the base station.

However, in wireless communication networks, due to such effects as shadowing arising from blockage by buildings and other obstructions between transmission/reception antennas, there exist dead zones in which communication with the base station is not possible, despite being within the service area. To combat this problem, in an Orthogonal Frequency Division Multiple Access (OFDMA) network, such as, for example, a network based on the Institute of Electrical and Electronics Engineers (IEEE) 802.16 standard, relay stations are employed for providing enhanced transmission capabilities by acting as intermediaries between mobile stations operating in the network and the base station. In this manner, a mobile station that is incapable of connecting directly to a base station within its cell service area may still connect indirectly to the base station by first communicating with a relay station that does have a direct link, or possibly an indirect link, to the base station.

Each relay station is provided with a hardware architecture for transmitting and receiving signals to and from other stations within a cell of the network. To this end, each relay station is generally provided with a switching system consisting of a single radio that switches the relay station between a transmit state, in which the relay station is capable of transmitting signals to one or more slave stations in the cell, and a receive state, in which the relay station is capable of receiving signals from a master station in the cell.

Generally, it is assumed that the relay station will switch from the transmit state to the receive state as soon as the relay station stops physically transmitting signals (ends a transmit zone) and will switch from the receive state to the transmit state as soon as the relay station stops physically receiving signals (ends a receive zone). However, prior art methods provide for a fixed amount of time to pass after a relay station ends a transmit zone before it switches to the receive state and for a fixed amount of time to pass after a relay station ends a receive zone before it switches to the transmit state.

SUMMARY OF THE INVENTION

Various embodiments of the present invention provide a method including, during a downlink sub-frame, controlling a relay station in a cell of a multi-hop relay network to end a transmit zone, in which the relay station transmits signals to one or more slave stations in the cell, in accordance with a one-way propagation delay between a base station in the cell and the relay station.

Various embodiments of the present invention provide a method including, during a downlink sub-frame, controlling a relay station in a cell of a multi-hop relay network to switch between a transmit zone, in which the relay station transmits signals to one or more slave stations in the cell, and a receive zone, in which the relay station receives signals from a master station in the cell, according to $R\_TTG=RS\_HW\_TTG-D$ and $R\_RTG=RS\_HW\_RTG+D$, when $RS\_HW\_TTG>D$. $R\_TTG$ is a time required to pass after the relay station ends the transmit zone before the relay station can start the receive zone. $RS\_HW\_TTG$ is a time required for a physical layer of the relay station to transition from a transmit state, in which the relay station is capable of transmitting signals, to a receive state, in which the relay station is capable of receiving signals. $D$ is a one-way propagation delay time between a base station in the cell and the relay station. $R\_RTG$ is a time required to pass after the relay station ends the receive zone before the relay station can start the transmit zone. $RS\_HW\_RTG$ is a time required for a physical layer of the relay station to transition from the receive state to the transmit state.

Various embodiments of the present invention provide a method including, during a downlink sub-frame, controlling a relay station in a cell of a multi-hop relay network to switch between a transmit zone, in which the relay station transmits signals to one or more slave stations in the cell, and a receive zone, in which the relay station receives signals from a master station in the cell, according to $R\_TTG=0$ and $R\_RTG=RS\_HW\_RTG+D$, when $RS\_HW\_TTG<D$. $R\_TTG$ is a time required to pass after the relay station ends the transmit zone before the relay station can start the receive zone. $D$ is a one-way propagation delay time between a base station in the cell and the relay station. $R\_RTG$ is a time required to pass after the relay station ends the receive zone before the relay station can start the transmit zone. $RS\_HW\_RTG$ is a time required for a physical layer of the relay station to transition from a receive state, in which the relay station is capable of receiving signals, to a transmit state, in which the relay station is capable of transmitting signals. $RS\_HW\_TTG$ is a time required for a physical layer of the relay station to transition from the transmit state to the receive state.

Various embodiments of the present invention provide a method including, during an uplink sub-frame, controlling a relay station in a cell of a multi-hop relay network to end a receive zone, in which the relay station receives signals from one or more slave stations in the cell, in accordance with a one-way propagation delay between a base station in the cell and the relay station.

Various embodiments of the present invention provide a method including, during an uplink sub-frame, controlling a relay station in a cell of a multi-hop relay network to switch between a transmit zone, in which the relay station transmits signals to a master station in the cell, and a receive zone, in which the relay station receives signals from one or more slave stations in the cell, according to $UL\_R\_RTG=D+RS\_HW\_RTG$ and $UL\_R\_TTG=RS\_HW\_TTG-D$, when $RS\_HW\_TTG>D$. $UL\_R\_RTG$ is a time required to pass after the relay station ends the receive zone before the relay station can start the transmit zone. $D$ is a one-way propagation delay time between a base station in the cell and the relay station. $RS\_HW\_RTG$ is a time required for a physical layer of the relay station to transition from a receive state, in which the relay station is capable of receiving signals transmit state, to a transmit state, in which the relay station is capable of transmitting signals. UL_R_TTG is a time required to pass after the relay station ends the transmit zone before the relay station can start the receive zone. RS_HW_TTG is a time required for a physical layer of the relay station to transition from the transmit state to the receive state.

Various embodiments of the present invention provide a method including, during an uplink sub-frame, controlling a relay station in a cell of a multi-hop relay network to switch between a transmit zone, in which the relay station transmits signals to a master station in the cell, and a receive zone, in which the relay station receives signals from one or more slave stations in the cell, according to UL_R_RTG=D+RS_HW_RTG and UL_R_TTG=0, when RS_HW_TTG<D. UL_R_RTG is a time required to pass after the relay station ends the receive zone before the relay station can start the transmit zone. D is a one-way propagation delay time between a base station in the cell and the relay station. RS_HW_RTG is a time required for a physical layer of the relay station to transition from a receive state, in which the relay station is capable of receiving signals transmit state, to a transmit state, in which the relay station is capable of transmitting signals. UL_R_TTG is a time required to pass after the relay station ends the transmit zone before the relay station can start the receive zone. RS_HW_TTG is a time required for a physical layer of the relay station to transition from the transmit state to the receive state.

Various embodiments of the present invention provide a relay station operating in a cell of a multi-hop relay network including, during a downlink sub-frame, first control means for controlling the relay station to end a transmit zone, in which the relay station transmits signals to one or more slave stations in the cell, at least a first predetermined period of time before the relay station begins a receive zone, in which the relay station receives signals from a master station in the cell and, during the downlink sub-frame, second control means for preventing the relay station from starting the transmit zone until at least a second predetermined period of time has passed since the relay station was in the receive zone. Furthermore, at least one of the first predetermined period of time and the second predetermined period of time depend on a one-way propagation delay between a base station in the cell and the relay station.

Various embodiments of the present invention provide a relay station operating in a cell of a multi-hop relay network including, during an uplink sub-frame, first control means for controlling the relay station to end a receive zone, in which the relay station receives signals from one or more slave stations in the cell, at least a first predetermined period of time before the relay station begins a transmit zone, in which the relay station transmits signals to a master station in the cell and, during the uplink sub-frame, second control means for preventing the relay station from starting the receive zone until at least a second predetermined period of time has passed since the relay station was in the transmit zone. Furthermore, at least one of the first predetermined period of time and the second predetermined period of time depend on a one-way propagation delay between a base station in the cell and the relay station.

The above embodiments of the present invention are simply examples, and all embodiments of the present invention are not limited to these examples.

Additional advantages of the invention will be set forth in part in the description which follows, and, in part, will be obvious from the description, or may be learned by practice of the invention.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Figure 1A:
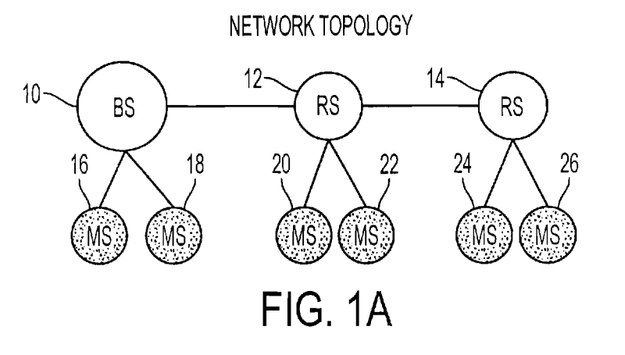
FIG. 1a is an illustration of an example of a network topology of a cell including a base station, two relay stations, and six mobile stations.

FIG. 1a is an illustrative example of an intra-cell topology involving relay stations operating in a multi-hop network. For example, the multi-hop network can be an OFDMA network based on the Institute of Electrical and Electronics Engineers (IEEE) 802.16 standard. However, the various embodiments of the present invention are not limited to a multi-hop network being an OFDMA network based on the Institute of Electrical and Electronics Engineers (IEEE) 802.16 standard, but can be any type of multi-hop network.

The network cell includes a base station (BS) 10, a first relay station (RS) 12, a second relay station (RS) 14, a first mobile station (MS) 16, a second mobile station (MS) 18, a third mobile station (MS) 20, a fourth mobile station (MS) 22, a fifth mobile station (MS) 24, and a sixth mobile station (MS) 26. In this example, mobile stations 16 and 18 are within range of base station 10, and, therefore, can communicate directly with base station 10 (as illustrated by the linking lines between base station 10 and each of mobile stations 16 and 18). Mobile stations 20 and 22 are out of range of base station 10 and, therefore, can only communicate with base station 10 indirectly through relay station 12, which can communicate directly with base station 10. Mobile stations 24 and 26 are even further out of range of base station 10 and, therefore, can only communicate with base station 10 indirectly through both relay station 12 and relay station 14, which can communicate directly with relay station 12, thus creating a multi-hop network cell.

Figure 1B:
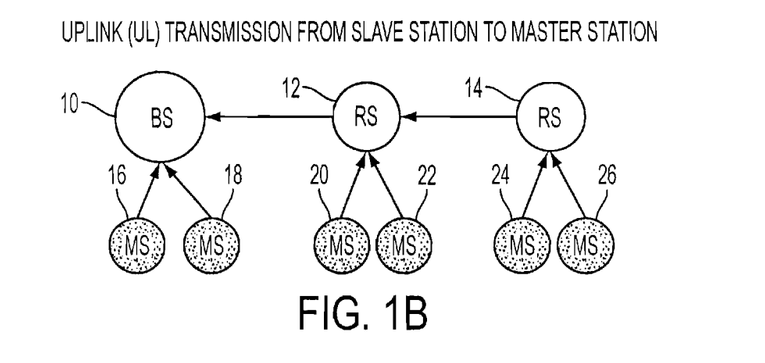
FIG. 1b is an illustration of the network topology of the cell illustrated in FIG. 1a during an uplink sub-frame.

FIG. 1b illustrates the flow of signals among the stations in the cell of FIG. 1a during an uplink sub-frame. During an uplink sub-frame, one or more slave stations in the cell are in a transmit state, in which these slave stations are capable of transmitting signals to one or more master stations in the cell. On the other hand, the one or more master stations in the cell are in a receive state, in which these master stations are capable of receiving signals from the one or more slave stations in the cell, during an uplink sub-frame. For example, relay station 12 is a slave station to base station 10 and, therefore, relay station 12 is capable of transmitting signals to base station 10 during an uplink sub-frame. However, relay station 12 also acts as a master station with respect to relay station 14 and, therefore, relay station 12 is capable of receiving signals from relay station 14 during an uplink sub-frame. Arrowed lines in FIG. 1b show additional examples of signal flow among the various stations in the cell during an uplink sub-frame.

In an OFDMA system, transmission takes place in a unit of symbols. During an uplink sub-frame, transmission time is referred to with respect to the start and end time of an OFDM symbol reception window operated by the base station (such as base station 10). This reception window includes all of the signals sent by a transmitter (slave station) corresponding to an OFDM symbol as they are sampled at the receiver (master station). Even if no slave station transmits in a particular OFDM symbol, the symbol number still increments by one. Furthermore, idle uplink times at a master station can be avoided by scheduling supplementary uplink access transmissions, thus improving the uplink bandwidth efficiency. These uplink access transmissions could be either sequential or non-sequential to the main uplink access zone.

For example, assuming that proper time adjustment (ranging) is done by a master station based on the OFDM symbols it receives from a slave station, the master station receives a signal of OFDM symbol k sent from a slave station in time interval [$Trx_k, Trx_{k+1}$]. Furthermore, assuming the propagation time between the master station and the slave station is D and that the timing adjustment is done properly, the slave station sends its symbol k to the master station in time interval [$Trx_k-D, Trx_{k+1}-D$]. According to various embodiments of the present invention, timing adjustments are made at the relay station level so that the reception windows of each of the master stations are synchronized or aligned in an uplink sub-frame.

Figure 1C:
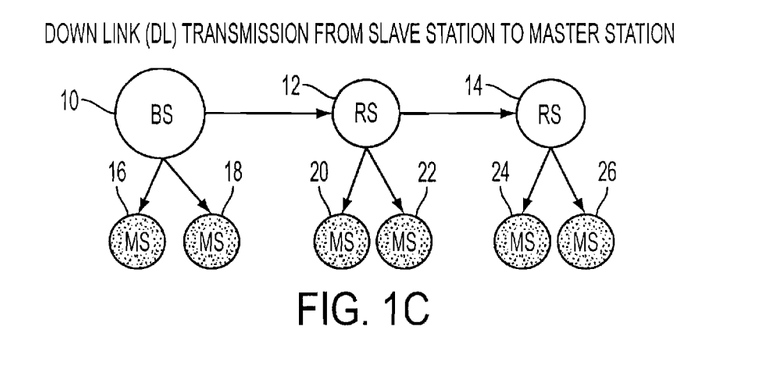
FIG. 1c is an illustration of the network topology of the cell illustrated in FIG. 1a during a downlink sub-frame.

FIG. 1c illustrates the flow of signals among the stations in the cell of FIG. 1a during a downlink sub-frame. During a downlink sub-frame, one or more master stations in the cell are in a transmit state, in which these master stations are capable of transmitting signals to one or more slave stations in the cell. On the other hand, the one or more slave stations in the cell are in a receive state, in which these slave stations are capable of receiving signals from the one or more master stations in the cell, during a downlink sub-frame. For example, relay station 12 is a slave station to base station 10 and, therefore, relay station 12 is capable of receiving signals from base station 10 during a downlink sub-frame. However, relay station 12 also acts as a master station with respect to relay station 14 and, therefore, relay station 12 is capable of transmitting signals to relay station 14 during a downlink sub-frame. Arrowed lines in FIG. 1c show additional examples of signal flow among the various stations in the cell during a downlink sub-frame.

During a downlink sub-frame, transmission time is referred to with respect to the start and end time of OFDM symbols transmitted by the base station (such as base station 10). A slave station that is capable of receiving signals from a master station adjusts its reception window based on the OFDM symbol arriving at its radio receiver. Even if the base station does not transmit in a particular OFDM symbol, the symbol number still increments by one. For example, symbol k is sent in time interval [$Trx_k, Trx_{k+1}$]. Assuming the propagation time between the master station and the slave station is D, if the master station sends its symbol k to the slave station in time interval [$Trx_k, Trx_{k+1}$], then it reaches the slave station at time interval [$Trx_k+D, Trx_{k+1}+D$]. According to various embodiments of the present invention, timing adjustments are made at the relay station level so that the master stations in the cell transmit their signals in sync in a downlink sub-frame.

Furthermore, idle downlink times at a master station can be avoided by scheduling supplementary downlink access transmissions, thus improving the downlink bandwidth efficiency. These downlink access transmissions could be either sequential or non-sequential to the main downlink access zone.

FIGS. 1a through 1c are only an illustrative example of an intra-cell topology involving two relay stations operating in a multi-hop network. The various embodiments of the present invention are not limited to a multi-hop network including only a single base station, two relay stations, and six mobile stations as illustrated in FIGS. 1a through 1c, but may include any multi-hop wireless communication network supporting any number of base stations, relay stations, and mobile stations.

Figure 2:
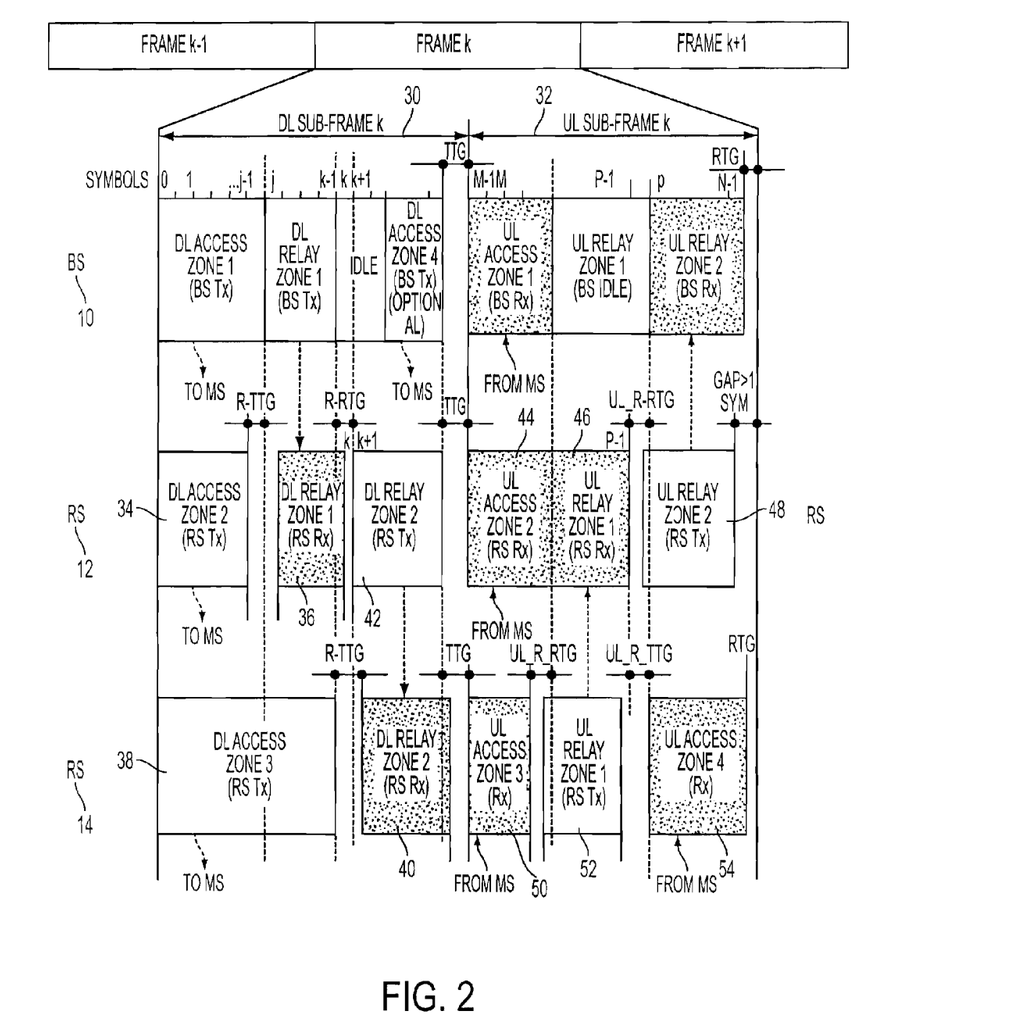
FIG. 2 is an illustration of a frame structure for the cell illustrated in FIG. 1a, according to an embodiment of the present invention.

FIG. 2 illustrates a frame structure and signal traffic activity for the base station 10 and relay stations 12 and 14 operating in the multi-hop network illustrated in FIG. 1a, according to an embodiment of the present invention. More specifically, FIG. 2 displays a frame structure and signal traffic activity for a given frame k when the time (RS_H-W_TTG) required for a physical layer of the relay station (in this case, either of relay stations 12 and 14) to transition from a transmit state, in which the relay station is capable of transmitting signals, to a receive state, in which the relay station is capable of receiving signals, is greater than a one-way propagation delay time (D) between a base station in the cell (in this case, base station 10) and the relay station (in this case, either of relay stations 12 and 14).

Frame k includes a downlink (DL) sub-frame 30 and an uplink (UL) sub-frame 32. The downlink sub-frame 30 includes a number of OFDM symbols, such that a number M of OFDM symbols in the downlink sub-frame 30 is from 0 to M-1, if base station 10 transmits in every time symbol. However, as discussed above, if base station 10 does not transmit in a particular OFDM symbol, the symbol number still increments by one.

The uplink sub-frame 32 also includes a number of OFDM symbols, such that a number N of OFDM symbols in the uplink sub-frame 32 is from 0 to N-1. However, as discussed above, even if no slave stations transmit in a particular OFDM symbol, the symbol number still increments by one.

Generally, it is assumed that a relay station (such as relay station 12 or 14) will transition from a transmit state, in which the relay station is capable of transmitting signals to one or more other stations in the cell, to a receive state, in which the relay station is capable of receiving signals from one or more other stations in the cell, as soon as the relay station stops a transmit zone, which is defined as a time in which the relay station is physically transmitting signals. Likewise, it is generally assumed that a relay station (such as relay station 12 or 14) will transition from the receive state to the transmit state as soon as the relay station stops a receive zone, which is defined as a time in which the relay station is physically receiving signals.

However, according to various embodiments of the present invention, each of relay stations 12 and 14 are controlled such that, during a downlink sub-frame, each relay station will end a transmit zone, in which the relay station physically transmits signals to one or more slave stations in the cell, in accordance with a one-way propagation delay between a base station in the cell (in this case, base station 10) and the relay station itself (whether it be relay station 12 or relay station 14). More specifically, during the downlink sub-frame, each relay station is controlled to end the transmit zone at least a first predetermined period of time before the relay station begins a receive zone, in which the relay station receives signals from a master station in the cell. In an OFDM multihop network such as this, periods of time, such as the described first period of time, can be measured as a number of time symbols.

In this manner, each relay station is controlled according to a variable one-way propagation delay time between itself and the base station 10 and not according to a predetermined, fixed value used for all of the relay stations. Since each relay station can be located at any given location within the cell at any given time, controlling each relay station independently according to a variable one-way propagation delay time between the relay station itself and the base station increases the overall bandwidth efficiency. Of course, the one-way propagation delay may also be set as a maximal one-way propagation delay between a base station in the cell and any of the relay stations within the cell.

Referring to FIG. 2, when a time (RS_HW_TTG) required for a physical layer of a relay station (relay stations 12 and 14) to transition from a transmit state to a receive state is greater than the one-way propagation delay (D) between base station 10 and the given relay station, the first predetermined period of time (R_TTG) is equal to the time required for the physical layer of the relay station to transition from the transmit state to the receive state minus the one-way propagation delay (D) between base station 10 and the relay station. Since each relay station can be located at any given location within the cell at any given time, the one-way propagation delay time D can vary for each of the relay stations 12 and 14. As shown in FIG. 2, each relay station actually ends the transmit zone at a time symbol immediately after the first predetermined period of time has passed.

For example, relay station 12 begins downlink sub-frame 30 in a transmit zone 34 (DL Access Zone 2) in which relay station 12 is transmitting signals to its various mobile stations located within the cell. In this instance, relay station 12 acts as a master station, while the various mobile stations to which it is transmitting are slave stations. However, since relay station 12 also acts as a slave station to base station 10 during downlink sub-frame 30, relay station 12 must also receive signals from base station 10 in a receive zone 36 (DL Relay Zone 1). Of course, if relay station 12 has a single transceiver, it cannot transmit signals to the various mobile stations and receive signals from base station 10 at the same time. Therefore, relay station 12 must transition from the transmit zone 34 to the receive zone 36 during downlink sub-frame 30. As shown is FIG. 2, relay station 12 is controlled such that at least a period of time R_TTG is required between when relay station 12 ends transmit zone 34 and starts receive zone 36. In a similar manner, relay station 14 is controlled such that at least a period of time R_TTG is required between when relay station 14 ends transmit zone 38 (DL Access Zone 3), in which it transmits signals to its various mobile stations located within the cell, and starts receive zone 40 (DL Relay Zone 2), in which it receives signals from relay station 12.

Furthermore, according to various embodiments of the present invention, each of relay stations 12 and 14 are controlled such that, during a downlink sub-frame, each relay station will start the transmit zone in accordance with the one-way propagation delay between the base station 10 and the relay station itself (whether it be relay station 12 or relay station 14). More specifically, during the downlink sub-frame, each relay station is prevented from starting the transmit zone until at least a second predetermined period of time has passed since the relay station was in the receive zone. In an OFDM multi-hop network such as this, periods of time, such as the described second period of time, can be measured as a number of time symbols.

Referring to FIG. 2, when a time (RS_HW_TTG) required for a physical layer of a relay station (relay stations 12 and 14) to transition from a transmit state to a receive state is greater than the one-way propagation delay (D) between base station 10 and the given relay station, the second predetermined period of time (R_RTG) is equal to a time (RS_HW-RTG) required for the physical layer of the relay station to transition from the receive state to the transmit state plus the one-way propagation delay (D) between base station 10 and the relay station. Since each relay station can be located at any given location within the cell at any given time, the one-way propagation delay time D can vary for each of the relay stations 12 and 14. As shown in FIG. 2, each relay station is actually prevented from starting the transmit zone until a time symbol immediately after the second predetermined period of time has passed.

For example, as discussed above, relay station 12 acts as a slave station to base station 10 during downlink sub-frame 30 and receives signals from base station 10 in a receive zone 36. However, since relay station 12 also acts as a master station to relay station 14 during downlink sub-frame 30, relay station 12 must also transmit signals to relay station 14 in a transmit zone 42 (DL Relay Zone 2). Of course, if relay station 12 has a single transceiver, it cannot receive signals from base station 10 and transmit signals to relay station 14 at the same time. Therefore, relay station 12 must transition from the receive zone 36 to the transmit zone 42 during downlink sub-frame 30. As shown is FIG. 2, relay station 12 is controlled such that it is prevented from starting transmit zone 42 until at least a period of time R_RTG has passed since it was in receive zone 36.

According to the notations used in various standards, including various IEEE 802.16 standards, the relay station control discussed above can be expressed as R_TTG=⌈RS_HW_TTG−D⌉ and R_RTG=⌈RS_HW_RTG+D⌉, when RS_HW_TTG>D, where R_TTG is a time required to pass after the relay station ends the transmit zone before the relay station can start the receive zone, RS_HW_TTG is a time required for a physical layer of the relay station to transition from a transmit state, in which the relay station is capable of transmitting signals, to a receive state, in which the relay station is capable of receiving signals, D is a one-way propagation delay time between a base station in the cell and the relay station being controlled, R_RTG is a time required to pass after the relay station ends the receive zone before the relay station can start the transmit zone, and RS_HW_RTG is a time required for a physical layer of the relay station to transition from the receive state to the transmit state. The symbols ⌈ and ⌉ indicate that the time is "rounded up" to the next transmission time unit, in this case the next time symbol. In other words, when R_RTG, the time required to pass after the relay station ends the receive zone before the relay station can start the transmit zone, is expressed as ⌈RS_HW_TTG−D⌉, the indication is that the relay station can start the transmit zone at the time symbol immediately after the time period RS_HW_TTG−D has passed.

According to various embodiments of the present invention, each of relay stations 12 and 14 are controlled such that, during an uplink sub-frame, each relay station will end a receive zone, in which the relay station physically receives signals from one or more slave stations in the cell, in accordance with a one-way propagation delay between a base station in the cell (in this case, base station 10) and the controlled relay station (relay station 12 or 14). More specifically, during the uplink sub-frame, each relay station is controlled to end the receive zone at least a first predetermined period of time before the relay station begins a transmit zone, in which the relay station transmits signals to a master station in the cell.

Referring to FIG. 2, when a time (RS_HW_TTG) required for a physical layer of a relay station (either relay station 12 or 14) to transition from a transmit state to a receive state is greater than the maximal one-way propagation delay (D) between base station 10 and the given relay station, the first predetermined period of time (UL_R_RTG) is equal to a time (RS_HW_RTG) required for the physical layer of the relay station to transition from the receive state to the transmit state plus the maximal one-way propagation delay (D) between base station 10 and the relay station. Since each relay station can be located at any given location within the cell at any given time, the one-way propagation delay time D can vary for each of the relay stations 12 and 14. As shown in FIG. 2, each relay station actually ends the receive zone at a time symbol immediately after the first predetermined period of time has passed.

For example, relay station 12 begins uplink sub-frame 32 in a receive zone 44 (UL Access Zone 2) in which relay station 12 is receiving signals from its various mobile stations located within the cell. Following receive zone 44, relay station 12 enters receive zone 46 (UL Relay Zone 1), in which it receives signals from relay station 14. However, relay station 12 must also transmit signals to base station 10 in a transmit zone 48 (UL Relay Zone 2) during uplink sub-frame 32. Of course, if relay station 12 has a single transceiver, it cannot receive signals from relay station 14 and transmit signals to base station 10 at the same time. Therefore, relay station 12 must transition from the receive zone 46 to the transmit zone 48 during uplink sub-frame 32. As shown is FIG. 2, relay station 12 is controlled such that at least a period of time UL_R_RTG is required between when relay station 12 ends receive zone 46 and starts transmit zone 48. In a similar manner, relay station 14 is controlled such that at least a period of time UL_R_RTG is required between when relay station 14 ends receive zone 50 (UL Access Zone 3), in which it receives signals from its various mobile stations located within the cell, and starts transmit zone 52 (UL Relay Zone 1), in which it transmits signals to relay station 12.

Furthermore, according to various embodiments of the present invention, each of relay stations 12 and 14 are controlled such that, during an uplink sub-frame, each relay station will start a receive zone in accordance with the one-way propagation delay between the base station 10 and the controlled relay station. More specifically, during the uplink sub-frame, each relay station is prevented from starting the receive zone until at least a second predetermined period of time has passed since the relay station was in the transmit zone.

Referring to FIG. 2, when a time (RS_HW_TTG) required for a physical layer of a relay station (relay stations 12 and 14) to transition from a transmit state to a receive state is greater than the one-way propagation delay (D) between base station 10 and the given relay station, the second predetermined period of time (UL_R_TTG) is equal to the time (RS_HW_TTG) required for the physical layer of the relay station to transition from the receive state to the transmit state minus the one-way propagation delay (D) between base station 10 and the relay station. Since each relay station can be located at any given location within the cell at any given time, the one-way propagation delay time D can vary for each of the relay stations 12 and 14. As shown in FIG. 2, each relay station is actually prevented from starting a receive zone until a time symbol immediately after the second predetermined period of time has passed.

For example, as discussed above, relay station 14 transmits signals to relay station 12 in a transmit zone 52. However, relay station relay station 14 must also receive signals from its various mobile stations in a receive zone 54 during downlink sub-frame 32. Of course, if relay station 14 has a single transceiver, it cannot transmit signals to relay station 12 and receive signals from the various mobile stations at the same time. Therefore, relay station 14 must transition from the transmit zone 52 to the receive zone 54 (UL Access Zone 4) during uplink sub-frame 32. As shown is FIG. 2, relay station 14 is controlled such that it is prevented from starting receive zone 54 until at least a period of time UL_R_TTG has passed since it was in transmit zone 52.

According to the notations used in various standards, including various IEEE 802.16 standards, the relay station control discussed above can be expressed as UL_R_RTG=[D+RS_HW_RTG] and UL_R_TTG=[RS_HW_TTG−D], when RS_HW_TTG>D, where UL_R_RTG is a time required to pass after the relay station ends the receive zone before the relay station can start the transmit zone, D is a one-way propagation delay time between a base station in the cell and the controlled relay station, RS_HW_RTG is a time required for a physical layer of the relay station to transition from a receive state, in which the relay station is capable of receiving signals transmit state, to a transmit state, in which the relay station is capable of transmitting signals, UL_R_TTG is a time required to pass after the relay station ends the transmit zone before the relay station can start the receive zone, and RS_HW_TTG is a time required for a physical layer of the relay station to transition from the transmit state to the receive state.

Figure 3:
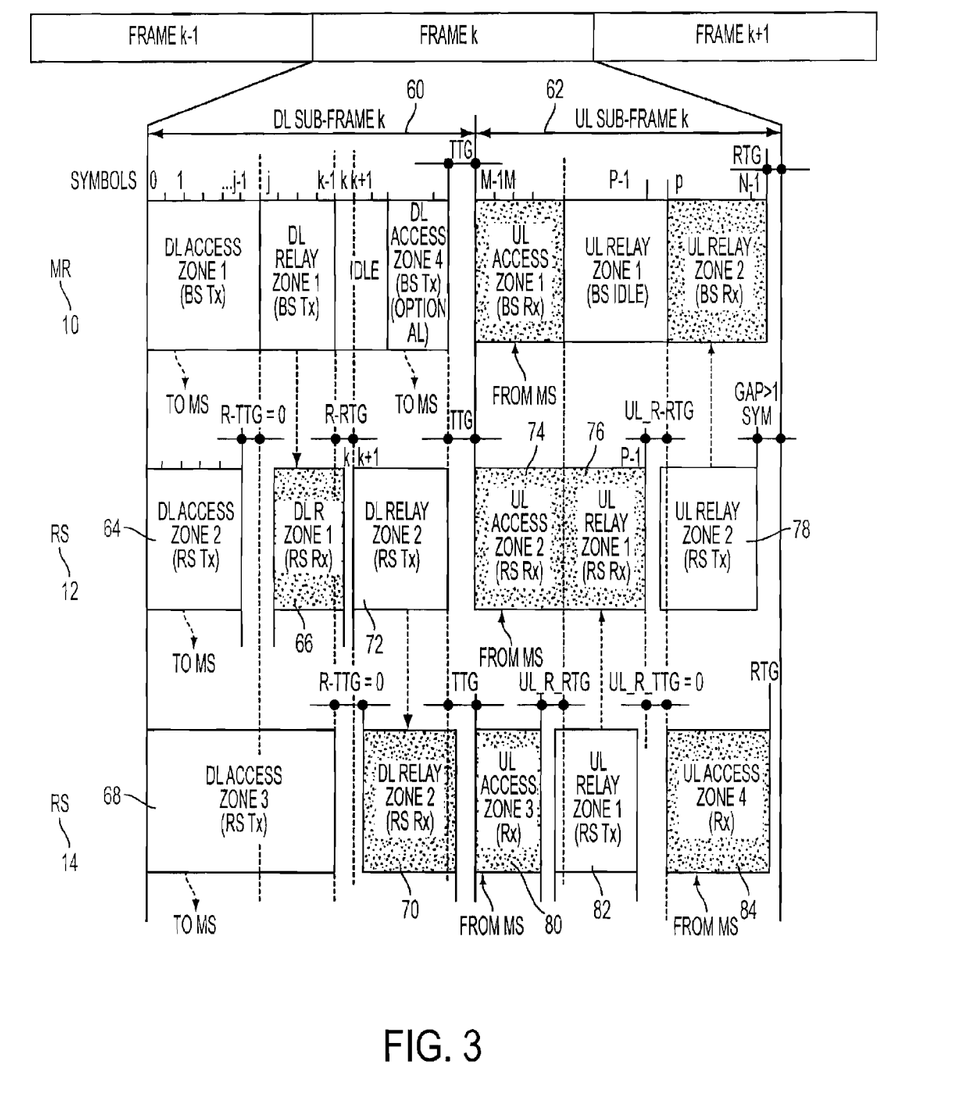
FIG. 3 is an illustration of a frame structure for the cell illustrated in FIG. 1a, according to an embodiment of the present invention.

FIG. 3 illustrates a frame structure and signal traffic activity for the base station 10 and relay stations 12 and 14 operating in the multi-hop network illustrated in FIG. 1a, according to an embodiment of the present invention. More specifically, FIG. 3 displays a frame structure and signal traffic activity for a given frame k when the time (RS_HW_TTG) required for a physical layer of the relay station (in this case, relay stations 12 and 14) to transition from a transmit state, in which the relay station is capable of transmitting signals, to a receive state, in which the relay station is capable of receiving signals, is less than a one-way propagation delay time (D) between a base station in the cell (in this case, base station 10) and the given relay station. Frame k includes a downlink sub-frame 60 and an uplink sub-frame 62 that are similar in symbol structure to downlink sub-frame 30 and uplink sub-frame 32 in FIG. 2.

According to various embodiments of the present invention, each of relay stations 12 and 14 are controlled such that, during a downlink sub-frame, each relay station will end a transmit zone, in which the relay station physically transmits signals to one or more slave stations in the cell, at the same time it starts a receive zone, in which it receives signals from its master station.

Referring to FIG. 3, when a time (RS_HW_TTG) required for a physical layer of a relay station (relay stations 12 and 14) to transition from a transmit state to a receive state is less than the one-way propagation delay (D) between base station 10 and the given relay station, the time (R_TTG) required to pass between when a relay stations ends a transmit zone and when the relay station begins a receive zone is equal to zero.

For example, relay station 12 begins downlink sub-frame 60 in a transmit zone 64 in which relay station 12 is transmitting signals to its various mobile stations located within the cell. In this instance, relay station 12 acts as a master station, while the various mobile stations to which it is transmitting are slave stations. However, since relay station 12 also acts as a slave station to base station 10 during downlink sub-frame 60, relay station 12 must also receive signals from base station 10 in a receive zone 66. Of course, if relay station 12 has a single transceiver, it cannot transmit signals to the various mobile stations and receive signals from base station 10 at the same time. Therefore, relay station 12 must transition from the transmit zone 64 to the receive zone 66 during downlink sub-frame 60. As shown is FIG. 2, relay station 12 is controlled such that no elapsed is required between when relay station 12 ends transmit zone 64 and starts receive zone 66 (in other words, R_TTG=0). In a similar manner, relay station 14 is controlled such that no elapsed time is required between when relay station 14 ends transmit zone 68, in which it transmits signals to its various mobile stations located within the cell, and starts receive zone 70, in which it receives signals from relay station 12 (in other words, R_TTG=0).

Furthermore, according to various embodiments of the present invention, each of relay stations 12 and 14 are controlled such that, during a downlink sub-frame, each relay station will start the transmit zone in accordance with the one-way propagation delay between the base station 10 and the controlled relay station. More specifically, during the downlink sub-frame, each relay station is prevented from starting the transmit zone until at least a predetermined period of time has passed since the relay station was in the receive zone.

In this manner, each relay station is controlled according to a variable one-way propagation delay time between itself and the base station 10 and not according to a predetermined, fixed value used for all of the relay stations. Since each relay station can be located at any given location within the cell at any given time, controlling each relay station independently according to a variable one-way propagation delay time between the relay station itself and the base station increases the overall bandwidth efficiency. Of course, the one-way propagation delay may also be set as a maximal one-way propagation delay between a base station in the cell and any of the relay stations within the cell.

Referring to FIG. 3, when a time (RS_HW_TTG) required for a physical layer of a relay station (relay stations 12 and 14) to transition from a transmit state to a receive state is less than the one-way propagation delay (D) between base station 10 and the given relay station, the predetermined period of time (R_RTG) is equal to a time (RS_HW_RTG) required for the physical layer of the relay station to transition from the receive state to the transmit state plus the one-way propagation delay (D) between base station 10 and the relay station. Since each relay station can be located at any given location within the cell at any given time, the one-way propagation delay time D can vary for each of the relay stations 12 and 14. As shown in FIG. 3, each relay station is actually prevented from starting the transmit zone until a time symbol immediately after the predetermined period of time has passed.

For example, as discussed above, relay station 12 acts as a slave station to base station 10 during downlink sub-frame 60 and receives signals from base station 10 in a receive zone 66. However, since relay station 12 also acts as a master station to relay station 14 during downlink sub-frame 60, relay station 12 must also transmit signals to relay station 14 in a transmit zone 72. Of course, if relay station 12 has a single transceiver, it cannot receive signals from base station 10 and transmit signals to relay station 14 at the same time. Therefore, relay station 12 must transition from the receive zone 66 to the transmit zone 72 during downlink sub-frame 60. As shown is FIG. 3, relay station 12 is controlled such that it is prevented from starting transmit zone 72 until at least a period of time R_RTG has passed since it was in receive zone 66.

According to the notations used in various standards, including various IEEE 802.16 standards, the relay station control discussed above can be expressed as R_TTG=0 and R_RTG=[RS_HW_RTG+D], when RS_HW_TTG<D, where R_TTG is a time required to pass after the relay station ends the transmit zone before the relay station can start the receive zone, D is a one-way propagation delay time between a base station in the cell and the controlled relay station, R_RTG is a time required to pass after the relay station ends the receive zone before the relay station can start the transmit zone, RS_HW_RTG is a time required for a physical layer of the relay station to transition from a receive state, in which the relay station is capable of receiving signals, to the a transmit state, in which the relay station is capable of transmitting signals, and RS_HW_TTG is a time required for a physical layer of the relay station to transition from the transmit state to the receive state.

According to various embodiments of the present invention, each of relay stations 12 and 14 are controlled such that, during an uplink sub-frame, each relay station will end a receive zone, in which the relay station physically receives signals from one or more slave stations in the cell, in accordance with a one-way propagation delay between a base station in the cell (in this case, base station 10) and the given relay station. More specifically, during the uplink sub-frame, each relay station is controlled to end the receive zone at least a predetermined period of time before the relay station begins a transmit zone, in which the relay station transmits signals to a master station in the cell.

Referring to FIG. 3, when a time (RS_HW_TTG) required for a physical layer of a relay station (relay stations 12 and 14) to transition from a transmit state to a receive state is less than the maximal one-way propagation delay (D) between base station 10 and the station within the cell that is the farthest away from base station 10, the predetermined period of time (UL_R_RTG) is equal to a time (RS_HW_RTG) required for the physical layer of the relay station to transition from the receive state to the transmit state plus the one-way propagation delay (D) between base station 10 and the given relay station. Since each relay station can be located at any given location within the cell at any given time, the one-way propagation delay time D can vary for each of the relay stations 12 and 14. As shown in FIG. 3, each relay station actually ends the receive zone at a time symbol immediately after the first predetermined period of time has passed.

For example, relay station 12 begins uplink sub-frame 62 in a receive zone 74 in which relay station 12 is receiving signals from its various mobile stations located within the cell. Following receive zone 74, relay station 12 enters receive zone 76, in which it receives signals from relay station 14. However, relay station 12 must also transmit signals to base station 10 in a transmit zone 78 during uplink sub-frame 62. Of course, if relay station 12 has a single transceiver, it cannot receive signals from relay station 14 and transmit signals to base station 10 at the same time. Therefore, relay station 12 must transition from the receive zone 76 to the transmit zone 78 during uplink sub-frame 62. As shown is FIG. 3, relay station 12 is controlled such that at least a period of time UL_R_RTG is required between when relay station 12 ends receive zone 76 and starts transmit zone 78. In a similar manner, relay station 14 is controlled such that at least a period of time UL_R_RTG is required between when relay station 14 ends receive zone 80, in which it receives signals from its various mobile stations located within the cell, and starts transmit zone 82, in which it transmits signals to relay station 12.

According to various embodiments of the present invention, each of relay stations 12 and 14 are controlled such that, during an uplink sub-frame, each relay station will start a receive zone, in which the relay station physically receives signals from one or more slave stations in the cell, at the same time it ends a transmit zone, in which it transmits signals to its master station.

Referring to FIG. 3, when a time (RS_HW_TTG) required for a physical layer of a relay station (relay stations 12 and 14) to transition from a transmit state to a receive state is less than the one-way propagation delay (D) between base station 10 and the given relay station, the time (UL_R_TTG) required to pass between when a relay stations starts a receive zone and when the relay station ends a transmit zone is equal to zero.

For example, as discussed above, relay station 14 transmits signals to relay station 12 in a transmit zone 82. However, relay station relay station 14 must also receive signals from its various mobile stations in a receive zone 84 during downlink sub-frame 32. Of course, if relay station 14 has a single transceiver, it cannot transmit signals to relay station 12 and receive signals from the various mobile stations at the same time. Therefore, relay station 14 must transition from the transmit zone 82 to the receive zone 84 during uplink sub-frame 62. As shown in FIG. 3, relay station 14 is controlled such that no elapsed is required between when relay station 14 ends transmit zone 82 and starts receive zone 84 (in other words, UL_R_TTG=0).

Figure 4:
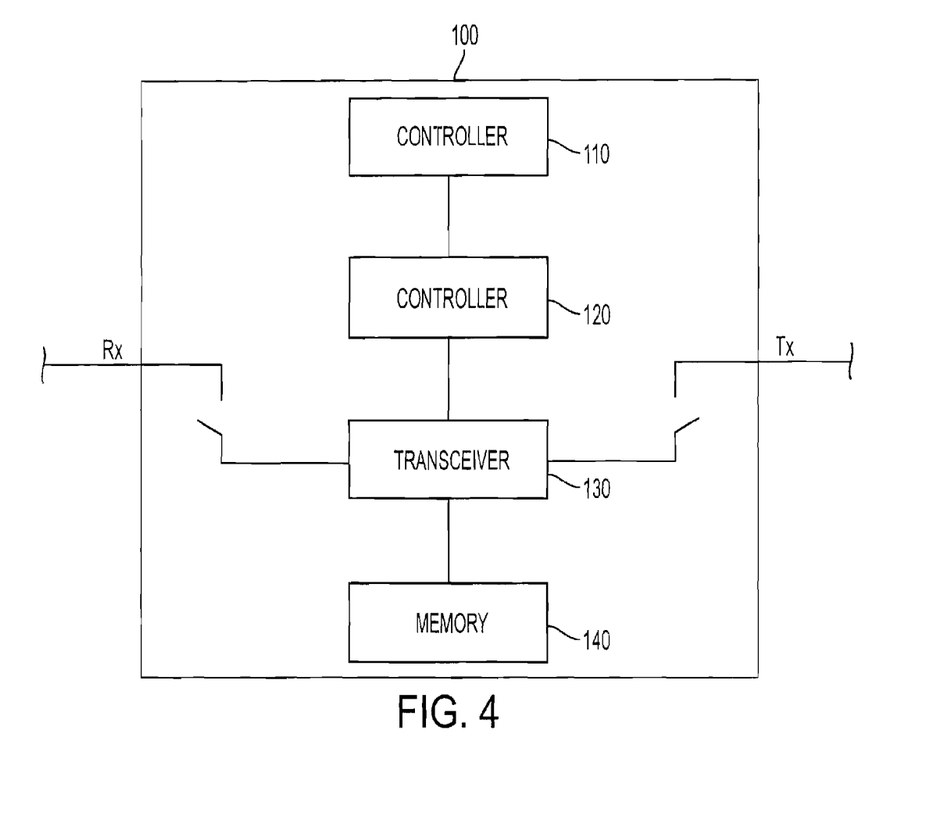
FIG. 4 is a block diagram of a relay station, according to an embodiment of the present invention.

According to the notations used in various standards, including various IEEE 802.16 standards, the relay station control discussed above can be expressed as UL_R_RTG=[D+RS_HW_RTG] and UL_R_TTG=0, when RS_HW_TTG<D, where UL_R_RTG is a time required to pass after the relay station ends the receive zone before the relay station can start the transmit zone, D is a one-way propagation delay time between a base station in the cell and the controlled relay station, RS_HW_RTG is a time required for a physical layer of the relay station to transition from a receive state, in which the relay station is capable of receiving signals transmit state, to a transmit state, in which the relay station is capable of transmitting signals, UL_R_TTG is a time required to pass after the relay station ends the transmit zone before the relay station can start the receive zone, and RS_HW_TTG is a time required for a physical layer of the relay station to transition from the transmit state to the receive state FIG. 4 illustrates a relay station 100 operating in a multi-hop network that implements the signal control methods described above. During a downlink sub-frame, relay station 100 includes a controller 110 for controlling the relay station to end a transmit zone, in which the relay station transmits signals to one or more slave stations in the cell, at least a first predetermined period of time before the relay station begins a receive zone, in which the relay station receives signals from a master station in the cell and a controller 120 for preventing the relay station from starting the transmit zone until at least a second predetermined period of time has passed since the relay station was in the receive zone. At least one of the first predetermined period of time and the second predetermined period of time depend on a one-way propagation delay between a base station in the cell and the relay station 100.

Controllers 110 and 120 could be, for example, separate computers or a single computer. However, the present invention is not limited to any particular controller configuration. Moreover, the present invention is not limited to the controllers being incorporated within a relay station. Instead, the controllers may be incorporated in any part of a wireless network system.

Relay station 100 may further include a transceiver 130 that is configured to switch between a transmit state, in which the transceiver (and therefore the relay station 00) is capable of transmitting signals, and a receive state, in which the transceiver (and therefore the relay station 100) is capable of receiving signals. Relay station 100 may also include a memory unit 140 for storing information related to the first predetermined period of time and the second predetermined period of time.

Figure 5:
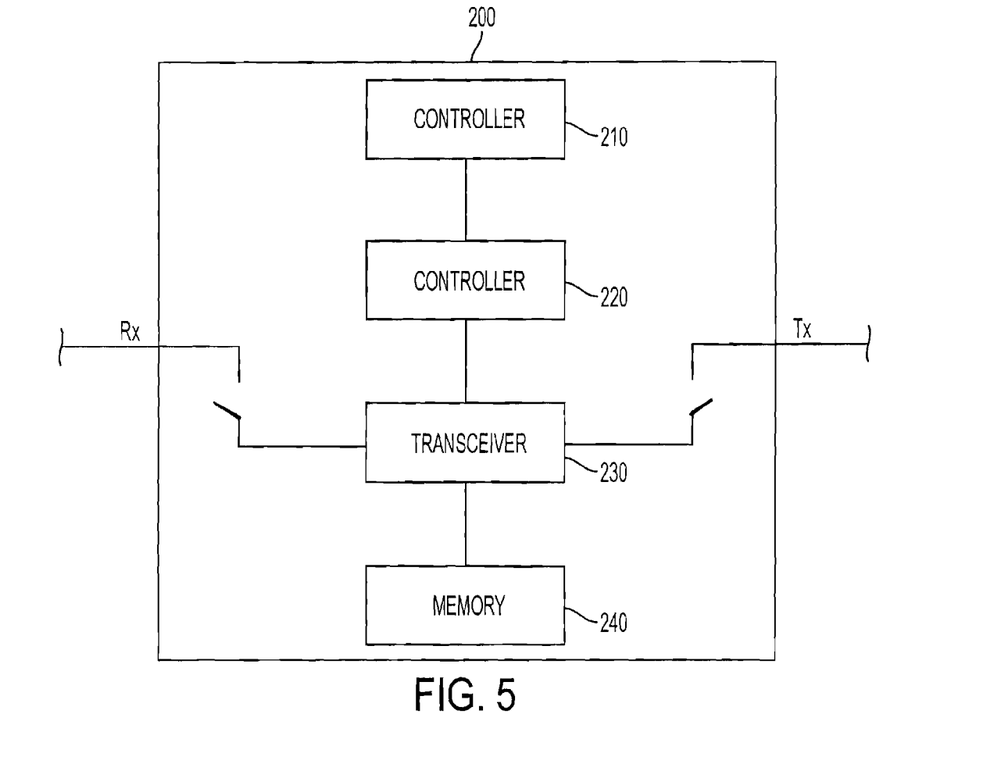
FIG. 5 is a block diagram of a relay station, according to an embodiment of the present invention.

FIG. 5 illustrates a relay station 200 operating in a multi-hop network that implements the signal control methods described above. During an uplink sub-frame, relay station 200 includes a controller 210 for controlling the relay station to end a receive zone, in which the relay station receives signals from one or more slave stations in the cell, at least a first predetermined period of time before the relay station begins a transmit zone, in which the relay station transmits signals to a master station in the cell and a controller 220 for preventing the relay station from starting the receive zone until at least a second predetermined period of time has passed since the relay station was in the transmit zone. At least one of the first predetermined period of time and the second predetermined period of time depend on a one-way propagation delay between a base station in the cell and the relay station 200.

Controllers 210 and 220 could be, for example, separate computers or a single computer. However, the present invention is not limited to any particular controller configuration. Moreover, the present invention is not limited to the controllers being incorporated within a relay station. Instead, the controllers may be incorporated in any part of a wireless network system.

Relay station 200 may further include a transceiver 230 that is configured to switch between a transmit state, in which the transceiver (and therefore the relay station 100) is capable of transmitting signals, and a receive state, in which the transceiver (and therefore the relay station 100) is capable of receiving signals. Relay station 200 may also include a memory unit 240 for storing information related to the first predetermined period of time and the second predetermined period of time.

The present invention relates to a multi-hop network under the IEEE 802.16 standard, which includes its amendments and extensions, such as, for example, but not limited to, IEEE 802.16e and IEEE 802.16j. The IEEE 802.16 standard is incorporated herein by reference in its entirety.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method for controlling communication in a cell of a multi-hop relay network including a base station, a plurality of relay stations, and a plurality of mobile stations, the plurality of relay stations being configured to operate as a master station or a slave station with respect to each other in the cell, the method comprising:

during a downlink sub-frame, when the relay station operates as the slave station, controlling the relay station, in accordance with a one-way propagation delay between the master station and the relay station in the cell, a first period required for the slave station to make a first transition from a transmit state in which the slave station is configured to transmit signals to a receive state in which the slave station is configured to receive signals and a second period required for the slave station to make a second transition from the receive state to the transmit state, so that the slave station ends a first transmit zone at least a third period before the master station starts a second transmit zone and the slave station starts a third transmit zone subsequent to the first transmit zone at least a fourth period after the master station ends the second transmit zone, the slave station being configured to transmit signals to one or more other slave stations in the first and third transmit zones, the master station being configured to transmit signals to the slave station in the second transmit zone, wherein the one-way propagation delay is variable, and when the first period is greater than the one-way propagation delay, the third period is equal to the first period minus the one-way propagation delay and the fourth period is equal to the second period plus the one-way propagation delay.

2. The method of claim 1, wherein, when the first period is less than the one-way propagation delay, the third period is equal to zero and the fourth period is equal to the second period plus the one-way propagation delay.

3. The method of claim 1, wherein the one-way propagation delay between the master station and the relay station is determined by the one-way propagation delay between the master station and the relay station within a cell that is the farthest away from the master station.

4. A method for controlling communication in a cell of a multi-hop relay network including a base station, a plurality of relay stations, and a plurality of mobile stations, the plurality of relay stations being configured to operate as a master station or a slave station with respect to each other in the cell, the method comprising:

during an uplink sub-frame, when the relay station operates as the slave station, controlling the relay station, in accordance with a one-way propagation delay between the master station and the relay station in the cell, a first period required for the slave station to make a first transition from a transmit state in which the slave station is configured to transmit signals to a receive state in which the slave station is configured to receive signals and a second period required for the slave station to make a second transition from the receive state to the transmit state, so that the slave station ends a first receive zone at least a third period before the master station starts a second receive zone and the slave station starts a third receive zone subsequent to the first receive zone at least a fourth period after the master station ends the second receive zone, the slave station being configured to receive signals from one or more of other slave stations the master station in the first and third receive zones, the master station being configured to receive signals from the slave station in the second receive zone, wherein the one-way propagation delay is variable, and when the first period is greater than the one-way propagation delay, the third period is equal to the second period plus the one-way propagation delay and the fourth period is equal to the first period minus the one-way propagation delay.

5. The method of claim 4, wherein, when the first period is less than the one-way propagation delay, the third period is equal to the second period plus the one-way propagation delay and the fourth period is equal to zero.

6. The method of claim 4, wherein the one-way propagation delay between the master station and the relay station is determined by the one-way propagation delay between the master station and the relay station within a cell that is the farthest away from the master station.

7. A relay station configured to operate in a cell of a multi-hop relay network including a base station, a plurality of other relay stations, and a plurality of mobile stations, the relay station and the plurality of other relay stations being configured to operate as a master station or a slave station with respect to each other in the cell, the relay station comprising:

a controller configured to control the relay station during a downlink sub-frame, when the relay station operates as the slave station, in accordance with a one-way propagation delay between the master station and the relay station, a first period required for the slave station to make a first transition from a transmit state in which the slave station is configured to transmit signals to a receive state in which the slave station is configured to receive signals and a second period required for the slave station to make a second transition from the receive state to the transmit state, so that the slave station ends a first transmit zone at least a third period before the master station starts a second transmit zone and the slave station starts a third transmit zone subsequent to the first transmit zone at least a fourth period after the master station ends the second transmit zone, the slave station being configured to transmit signals to one or more of other slave stations in the first and third transmit zones, the master station being configured to transmit signals to the slave station in the second transmit zone, wherein the one-way propagation delay is variable, and when the first period is greater than the one-way propagation delay, the third period is equal to the first period minus the one-way propagation delay and the fourth period is equal to the second period plus the one-way propagation delay.

8. The relay station of claim 7, wherein, when the first period is less than the one-way propagation delay, the third period is equal to zero and the fourth period is equal to the second period plus the one-way propagation delay.

9. The relay station of claim 7, wherein the one-way propagation delay between the master station and the relay station is determined by the one-way propagation delay between the master station and the relay station within a cell that is the farthest away from the master station.

10. A relay station configured to operate in a cell of a multi-hop relay network including a base station, a plurality of other relay stations and a plurality of mobile stations, the relay station and the plurality of other relay stations being configured to operate as a master station or a slave station with respect to each other in the cell, the relay station comprising:

a controller configured to control the relay station during an uplink sub-frame, when the relay station operates as the slave station, in accordance with a one-way propagation delay between the master station and the relay station, a first period required for the slave station to make a first transition from a transmit state in which the slave station is configured to transmit signals to a receive state in which the slave station is configured to receive signals and a second period required for the slave station to make a second transition from the receive state to the transmit state, so that the slave station ends a first receive zone at least a third period before the master station starts a second receive zone and the slave station starts a third receive zone subsequent to the first receive zone at least a fourth period after the master station ends the second receive zone, the slave station being configured to receive signals from one or more of other slave stations in the first and third receive zones, the master station being configured to receive signals from the slave station in the second receive zone, wherein the one-way propagation delay is variable, and when the first period is greater than the one-way propagation delay, the third period is equal to the second period plus the one-way propagation delay and the fourth period is equal to the first period minus the one-way propagation delay.

11. The relay station of claim 10, wherein, when the first period is less than the one-way propagation delay, the third period is equal to the second period plus the one-way propagation delay and the fourth period is equal to zero.

12. The relay station of claim 11, wherein the one-way propagation delay between the master station and the relay station is determined by the one-way propagation delay between the master station and the relay station within a cell that is the farthest away from the master station.

* * * * *